United States Patent [19]

Mao et al.

[11] Patent Number: 5,536,784
[45] Date of Patent: Jul. 16, 1996

[54] WATER BORNE CROSSLINKABLE COMPOSITIONS

[75] Inventors: Chung-Ling Mao, Emmaus; Ning Chen, Allentown; Chao-Fong Tien, Macungie, all of Pa.

[73] Assignee: Air Products and Chemicals, Inc., Allentown, Pa.

[21] Appl. No.: 319,365

[22] Filed: Oct. 6, 1994

[51] Int. Cl.$^6$ .................................................. C08L 61/00
[52] U.S. Cl. .......................... 525/154; 525/157; 525/165; 525/471
[58] Field of Search .......................... 524/521; 525/154, 525/157, 165, 471

[56] References Cited

U.S. PATENT DOCUMENTS

| | | |
|---|---|---|
| 3,668,183 | 6/1972 | Hoy et al. . |
| 4,743,668 | 5/1988 | Fong et al. ............................... 526/304 |
| 5,288,804 | 2/1994 | Kim et al. ................................. 525/154 |

FOREIGN PATENT DOCUMENTS 0552469 12/1992 European Pat. Off. .

OTHER PUBLICATIONS

Kim, Kyu–Jun and Roy C. Williams, "Utilization of the Novel Acetoacetate Chemistry in Solvent and Water Borne Coatings" presented at Water–Borne, Higher Solids and Powder Coatings Symposium, Feb. 24–26, 1993.

*Primary Examiner*—Jeffrey T. Smith
*Attorney, Agent, or Firm*—Russell L. Brewer; Michael Leach; William F. Marsh

[57] ABSTRACT

This invention relates to improved water-based polymeric dispersions having suitability for coatings and other applications which are based upon polymers having a plurality of acetoacetate functional groups and a crosslinkable component comprising a plurality of aromatic aldimine. The basic acetoacetate/benzaldimine containing system comprises an aqueous polymeric dispersion wherein the polymer has a plurality of acetoacetate groups and an effective amount of a curing agent having a plurality of benzaldimine functional groups. The improvement in providing for water-stable polymeric dispersions suitable for coatings and other applications comprises an aqueous dispersion comprising a polymeric component preferably derived from a plurality of polymerizable ethylenically unsaturated monomer units having pendant araldimine or heterocyclic aldimine functionality. Acetoacetate containing monomers generally are used in forming the polymer and a preferred monomer acetoacetoxyethymethacrylate. The polymer incorporating a plurality of benzaldimine functionality generally is formed by emulsion or suspension polymerization and the adimine functionality is benzaldimine.

23 Claims, No Drawings

WATER BORNE CROSSLINKABLE COMPOSITIONS

TECHNICAL FIELD

This invention relates to one pack polymeric compositions which are water dispersible and self-crosslinkable

BACKGROUND OF THE INVENTION

Current and proposed environmental regulations have been instrumental in the development of water borne coating and adhesive systems vis-a-vis solvent borne coating and adhesive systems in an effort to reduce volatile organic content (VOC) emitted to the atmosphere. One relatively new type of water borne system is based upon a polymeric system having plurality of acetoacetate groups and a crosslinker system of blocked polyamines which is capable of reacting with the acetoacetate groups. Recently developed blocked polyamine crosslinkers for acetoacetate coatings are based upon benzaldimine chemistry. Publications describing acetoacetate chemistry as well as that associated with benzaldimine crosslinking systems are as follows:

European Patent EP 0 552 469 discloses polyacetoacetate resins curable with a multifunctional benzaldimine. In the background of EP '469, the patentees point out that U.S. Pat. No. 3,668,183 discloses the use of a blocked aldimine or ketimine generated by the reaction of polyamine and an aliphatic ketone or aliphatic aldehyde as a curative for polyacetoacetate resins to form polyenamine resins. The patentees of '469 point out the aliphatic aldimine crosslinking system is moisture intolerant and that gloss and solvent resistance are not as high as desired. European '469 suggests the formation of a two component coating composition comprising a polymer containing a plurality of acetoacetate functional groups as a first component and a second component consisting of an aromatic aldimine having the structure:

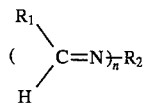

where $R_1$ is an aryl group, $R_2$ is a hydrocarbon, a polyalkylether, an oligomeric adduct or an acrylic polymer which may contain at least one group, such as secondary amine which will react with acetoacetate groups, and n is greater than 2 unless another acetoacetate reactive group is present. Both solvent and water borne coatings are prepared.

An article by Kim, et al., *Utilization of the Novel Acetoacetate Chemistry and Solvent and Water Borne Coatings*, presented at the Water Borne, Higher-Solids and Powder Coating Symposium, February 24–26, 1993, supplements European '469 EPO. Two component coating systems based upon acetoacetate functional polymers employing an aromatic aldimine as the crosslinker are described.

U.S. Pat. No. 5,288,804 is the U.S. companion to European '469 and to the article by Kim, et al.. It too, pertains to curable polyacetoacetate resins having low solvent loading.

U.S. Pat. No. 4,743,668 discloses vinyl polymers containing polymerized N-acetoacetylacrylamide units which are found useful for effecting coagulation, flocculation and dewatering of wet slurries. One of the monomer structures is represented by the formula:

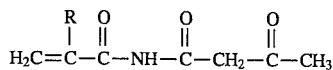

wherein R is H or $CH_3$. This monomer then is polymerized with a variety of other ethylenically unsaturated monomers, e.g., vinyl acetate, acrylic acid, acrylamide, vinylethers, maleic anhydride and so forth. Other monomers include acrylonitrile, various acrylic and methacrylic acid esters and the like. These polymers then are contacted with a bisulfite salt to form a sulfonate substituted material.

U.S. Pat. No. 4,908,403 discloses the production of pressure sensitive adhesives from acetoacetoxy-alkylacrylate polymers by emulsion polymerization. The monomers are generally defined by the formula:

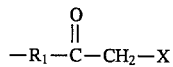

wherein $R_1$ is a divalent organic radical and X is an organoacyl or cyano group. The monomer is polymerized with other ethylenically unsaturated monomers, e.g., vinyl esters of carboxylic acids which include vinyl acetate and vinyl propionate; alpha-beta-unsaturated hydrocarbons, such as ethylene and propylene, and other monomers, e.g., vinyl chloride and alkyl esters of acrylic and methacrylic acid, as well as acrylic and methacrylic acid. The resultant polymers have acceptable adhesive strength without crosslinkers such as N-methylolamides. However, crosslinkers could be used as desired.

U.S. Pat. No. 5,332,785 discloses liquid coating compositions comprising acetoacetate modified epoxy resins and blocked polyamines, e.g., aldimines. Hydroxyl containing polyepoxides are converted to acetoacetate modified resins through transesterification using alkylesters of acetoacetic acid.

SUMMARY OF THE INVENTION

This invention relates to improved water-based polymeric dispersions having suitability for coatings, adhesives and use in many other applications. These dispersions are based upon polymers having a plurality of activated keto methylene groups, e.g., a beta diketone such as an acetoacetate or a keto cyano methylene functional groups and a crosslinkable component comprising an aldimine. The basic activated keto methylene/aldimine containing systems comprise an aqueous polymeric dispersion containing a polymeric component having a plurality of activated keto methylene groups, preferably acetoacetate groups, and a sufficient amount of an aldimine curing agent to effect reaction with the polymer containing the activated keto methylene groups and cure thereof. One improvement in the basic water-stable polymeric dispersions comprises a blend of a first aqueous dispersion comprising a polymeric component having a plurality of activated keto methylene functionality and a second aqueous dispersion comprising a polymeric component having a plurality of araldimine functionality. Another improvement variation to that previously suggested comprises a redispersible polymer(s) containing appropriately matched functionality dispersed separately as first and second emulsions, dispersed together in a single emulsion or one of the polymers is dispersed in an emulsion containing the polymer of matched functionality.

The polymeric component in the first aqueous dispersion generally is represented by the formula:

$$\text{Polymer-}\overset{O}{\overset{\|}{C}}\text{—CHR—}\overset{O}{\overset{\|}{C}}\text{—R}_1$$

and $$\text{Polymer-}\overset{O}{\overset{\|}{C}}\text{—CHR—CN}$$

wherein R is hydrogen or methyl and $R_1$ is $C_{1-4}$ alkyl.

The polymeric component is one that is water dispersible. Examples include addition polymers formed by the polymerization of ethylenically unsaturated monomers or condensation polymers such as polyurethane, epoxy and polyester resins and combinations of condensation and addition polymers, e.g., polyurethane/acrylate hybrids.

The second aqueous dispersion containing a polymeric component having araldimine functionality is generally represented by the formula:

$$\text{Polymer—N=CH—R}_2$$

wherein $R_2$ is the residue of an aromatic aldimine. Examples include addition polymers formed by the polymerization of ethylenically unsaturated monomers, condensation polymers such as polyurethane, epoxy and polyester resins and combinations such as polyurethane/acrylate hybrids.

There are several advantages associated with these dispersions and these include:

an ability to produce a low volatile organic content, formaldehyde free, shelf stable, one pack aqueous dispersion;

an ability to produce a one pack, water borne aqueous dispersion having self crosslinkability;

an ability to form a water borne dispersion which is curable at both ambient and elevated temperatures upon the evaporation of water; and, an ability to form one pack premium hybrid urethane/acrylic coatings which are surfactant free and self-crosslinkable.

DETAILED DESCRIPTION OF THE INVENTION

One of the components making up the one pack polymeric water-based dispersion having application in coatings, etc., is a water based dispersion of a polymeric component having pendant activated keto methylene functionality, preferably acetoacetate functionality. By activated it is meant that the proton(s) on the methylene group adjacent the carbonyl group are sufficiently reactive with araldimine groups to effect reaction and crosslinking. Two types of techniques have been generally utilized in preparing aqueous dispersions containing polymeric components having activated keto methylene functionality, particularly, wherein the polymeric component has acetoacetate functionality. One technique involves the addition polymerization of a monomer having an activated keto methylene group, e.g., a monomer containing at least one acetoacetate group via emulsion or suspension polymerization. (For purposes herein suspension polymerization is equivalent to and incorporated by reference within the term emulsion polymerization.) Another technique for preparing the polymeric component involves the emulsion polymerization of monomers capable of forming polymers having pendant functional groups convertible to activated keto methylene groups. The use of hydroxyl functional monomers, e.g., hydroxy acrylates, to form such polymers is one way of forming these polymers. These hydroxyl groups then can be converted to activated keto methylene groups via transesterification. Transesterification can be effected by reacting an alkyl acetoacetate, e.g., t-butyl acetoacetate with the hydroxy functional polymer. Other monomers having functional groups convertible to hydroxyl groups, for example, allyl chloride can also be used as a monomer for forming the acetoacetate containing polymer.

Generally, the polymeric component containing the activated keto methylene group have polymerized unsaturation units as follows:

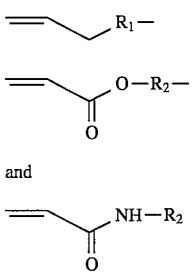

and wherein $R_1$ is $C_{1-10}$ alkyl, $C_{2-10}$ alkoxy, hydroxyalkyl where the alkyl group has from 1–10 carbon atoms and $R_2$ is $C_{1-10}$ alkyl, alkoxy, hydroxyalkyl where the alkyl group has from 1–10 carbon atoms. Examples of preferred ethylenically unsaturated monomers are those which include acetoacetate functionality. Specific examples include are acetoacetoxyethylmethacrylate and N-acetoacetylacrylamide.

The active keto methylene, e.g., acetoacetate-functional group generally comprises from about 2.5 to 50 weight percent of the total polymer. Preferably from about 5–25% of acetoacetate functionality based upon the total weight of the polymer is used. Generally, it takes a small amount of cross-linking to produce desired results, e.g., solvent and water resistance with modest flexibility. High levels of activated keto methylene functionality may reduce stability in an aqueous system and one should consider the polymer system and degree of cross-linking required when forming the polymers. In addition these polymers should have a molecular weight of at least 10,000. Preferably, the molecular weight of the addition polymer will be from about 10,000 to 500,000.

Addition polymers generally are copolymers of the monomers having keto methylene functionality or groups convertible to acetoacetate functionality. The monomers containing activated methylene functionality can be reacted with other ethylenically unsaturated monomers containing reactive functional groups to form copolymers containing appropriate levels of keto methylene functionality. These monomers include epoxy-containing monomers and carboxylic acid-containing monomers. Representative epoxy-containing functional monomers are glycidyl acrylate, glycidyl methacrylate, N-glycidylacrylamide and allylglycidyl ether, while the carboxylic acid containing monomers include acrylic and methacrylic acid, crotonic and itaconic acid and anhydrides such as maleic anhydride, phthalic anhydride, itaconic anhydride, etc. Carboxylic acid amides include acrylamide and N-methylol acrylamide, etc.

The acetoacetate functional monomers also can be polymerized with a variety of ethylenically unsaturated monomers having limited to no reactive functionality. These monomers include $C_1$–$C_8$ alkyl esters of acrylic and methacrylic acid, vinyl esters such as vinyl acetate and vinyl propionate, vinyl chloride, acrylonitrile, butadiene, styrene, etc. Preferred ethylenically unsaturated monomers copolymerizable with the monomers containing activated keto methylene functionality include alkyl (meth)acrylates and specifically methyl methacrylate, 2-ethylhexylacrylate and butyl acrylate.

Aqueous dispersions of condensation polymers containing acetoacetate functionality also are known and can also be used in forming the first aqueous dispersion. These aqueous systems can be derived from polyurethanes, polyepoxide and polyesters having pendant hydroxyl groups. Generally, they will have a molecular weight of from 1,000 to 200,000. Water dispersible polyurethane condensation polymers are prepared by reacting polyisocyanates with polyhydric compounds incorporating functionality suited for effecting dispersibility in water or through the use of surfactants. Examples of polyisocyanates include the aromatic, aliphatic, and cycloaliphatic isocyanates, such as toluenediisocyanate, m-phenylene diisocyanate, isophorone diisocyanate, methylene di(phenylisocyanate) and methylene-di-(cyclohexylisocyanate). Polyhydric compounds suited for reaction with the polyisocyanates to form the polyurethanes typically include both short-chain or long-chain polyols. Examples of short-chain polyols are the lower aliphatic $C_{1-6}$ aliphatic glycols, such as ethylene glycol, butanediol, hexanediol, glycerine, trimethylolpropane and pentaerythritol. Long-chain polyols can be used for preparing polyurethane prepolymers and these include poly(tetramethylene glycol) and polyethylene and polypropylene oxide adducts of ethylene glycol, propylene glycol, butane diol, etc. Molecular weights of these long chain polyols range typically from about 300 to 3000.

Water dispersible polyepoxide resins containing pendant hydroxyl groups also are known and can be formed by the reaction of bridged phenols with epichlorohydrin. Typically, the bridging group is a propylidine or methylene group. Examples of polyepoxides include dispersion of glycidyl ether of polyhydric phenols such as bisphenol A and bisphenol F. Typically, they are in the form of adducts derived by reacting a polyamine with the epoxy group. Residual epoxides can be converted to acetoacetate containing polymers by transesterification of pendant hydroxyl groups with t-butylacetoacetate. A combination of condensation polymers can be formed into water borne dispersions and appropriate functionality applied thereto. Polyurethane resins can be combined with an epoxy component as for example as described in U.S. Pat. No. 4,772,643 which is incorporated by reference.

The second aqueous dispersion containing a polymeric component for use in forming the resulting shelf stable, self-crosslinkable aqueous dispersion, like the polymer containing activated keto methylene groups is formed generally by addition polymerizing an ethylenically unsaturated monomer containing an araldimine functional group under emulsion polymerization conditions. Alternatively, the polymer may be formed of monomers having functionality convertible to araldimine. Typically, the polymer in the dispersion will have a molecular weight of at least 10,000. Preferably, the molecular weight of the polymer will be from 10,000 to 500,000. The level of araldimine in the polymer generally will be from about 2.5 to 50 percent by weight of the total polymer. Preferably, the polymer will comprise from about 5 to 25 percent by weight araldimine of the total weight of the polymer. High levels of araldimine may tend to reduce stability and the level should be monitored to achieve desired cross-linking without adversely affecting water dispersibility or stability.

One technique for generating the polymer is by emulsion polymerizing an ethylenically unsaturated monomer containing such araldimine functionality. The monomers are represented by the formula:

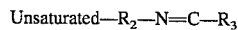

Unsaturated—$R_2$—N=C—$R_3$ wherein unsaturated refers to acrylic, vinyl and allylic unsaturation, preferably acrylic, $R_2$ is $C_{1\text{-}10}$ alkylene, $C_{1\text{-}10}$ alkoxy, secondary and tertiary amine, and $R_3$ is an aromatic aldehyde, preferably benzaldehyde. A preferred monomer is one where the aromatic aldimine, including heterocyclic aldimines is represented by the structure selected from the group consisting of:

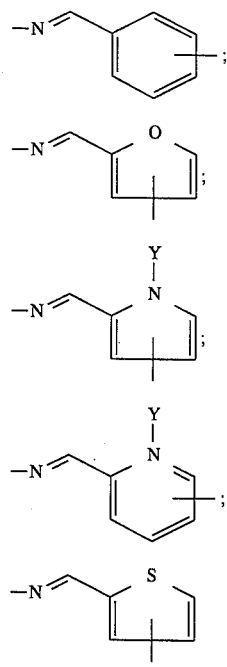

wherein Y is hydrogen or methyl. Isomers of the above are contemplated within the above structures.

A preferred monomer is represented by the formula

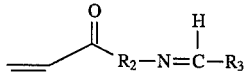

wherein $R_2$ is $C_{1\text{-}10}$ alkyl or $C_{1\text{-}10}$ alkoxy and $R_3$ is the residue of benzaldehyde or substituted derivative thereof.

One mechanism for generating the addition polymer is through addition polymerization of an ethylenically unsaturated monomer having araldimine functionality. The monomer can be obtained by reacting a primary alkanolamine or primary hydroxyalkylether amine with an aromatic aldehyde such as benzaldehyde or a substituted derivative thereof generating an intermediate hydroxy-araldimine or hydroxyalkylether araldimine. Unsaturation can be imparted to the intermediate by reacting the hydroxy araldimine with a hydroxy reactive ethylenically unsaturated monomer, such as acryloyl chloride. Representative primary amines used in forming the araldimine functional monomer are those containing primary amine functionality and no other functionality reactive with the activated keto methylene or acetoacetate group. These include aliphatic primary amines, such as $C_2$–$C_{10}$ hydroxyalkylamines, e.g., monoethanolamine, hydroxypropyl amine, and the like; hydroxyether amines, e.g., ethoxyethanolamine and hydroxypropyletheramine. One can also use an amine containing monomer, e.g., allyl amine to generate the aldimine containing monomer.

Another method of forming the araldimine containing polymer is through the addition polymerization of monomers convertible to polymers containing primary amine groups followed by reaction with an aromatic aldehyde. Examples of amine containing polymers include hydrolyzed N-vinylformamide containing polymers, e.g., vinyl acetate-vinylamine polymers or an allyl amine copolymer.

Conversion of the monomer containing primary amine functionality or polymer containing primary amine functionality to araldimine may be accomplished with a multitude of aromatic aldehydes which by definition includes unsaturated heterocyclic aldehydes. These aromatic aldehydes may be reacted with the amine functionality to form the araldimine complex. These aldehydes include benzaldehydes and substituted derivatives, e.g., $C_{1-6}$ alkyl and alkoxy substituted derivatives such as methyl and methoxy benzaldehyde, halogenated benzaldehyde, etc.; fused aromatic aldehydes such as napthaldehyde; heterocylic aldehydes such as furfuraldehyde, thiophenecarboxaldehyde, pyridinecarboxaldehyde, etc. Representative aldehydes are represented by the structures:

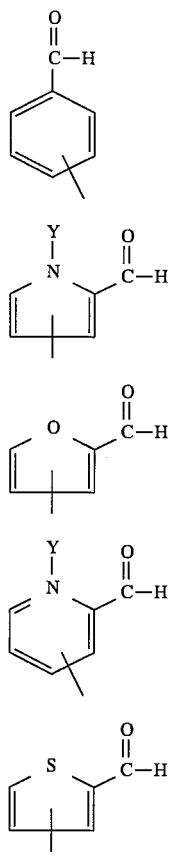

wherein Y represents hydrogen or methyl. Of course, isomers of the above are included within the above structures. Open bonds represent hydrogen or a substituent such as an alkyl group which does not interfere with the formation of the aldimine or cause premature reaction with the activated keto methylene group present in the first polymer. For preferred results benzaldehyde is employed for forming the araldimine structure.

Other ethylenically unsaturated monomer systems can be incorporated into the araldimine-containing polymer, e.g., from about 50 to 97.5% by weight of the resulting polymer. Examples of polymerizable ethylenically unsaturated monomers suited for polymerization with the ethylenically unsaturated araldimine containing monomers or polymers having amine groups convertible to araldimine include styrene, butadiene, $C_1$–$C_8$ alkyl esters of acrylic and methacrylic acid, e.g., methylacrylate, ethylhexylacrylate, methylmethacrylate, ethylacrylate, butyl acrylate and the like; hydroxyalkylacrylates such as hydroxyethylacrylate; acrylonitrile; and vinyl compounds such as vinyl chloride and vinyl acetate.

As in the formation of the polymer in the first dispersion, the polymers used in forming the water based araldimine polymer can be generated from condensation polymers. The polymers should be water dispersible and have araldimine functionality or functionality capable of being converted to araldimine.

A combination of condensation/addition polymerization methods can be used to form each polymeric component in the blend, as for example, each polymeric component can be in the form of a polyurethane/acrylate hybrid, one containing acetoacetate functionality or the other hybrid containing araldimine functionality. Because of the importance of polyurethane hybrids in coating applications, such water based polymers are described further.

Water dispersible polyurethane/acrylate hybrids are the preferred form for producing the one pack dispersions and the preparation is more fully described. In producing the water dispersible hybrids, the acrylate monomer containing the respective functionality is addition polymerized onto the polyurethane prepolymer backbone. These polyurethanes typically incorporate acid functionality in order to enhance water dispersibility and water resistance. Acid functional compounds which may be used in the preparation of the anionic water-dispersible prepolymers include carboxy group containing diols and triols, for example dihydroxyalkanoic acids of the formula:

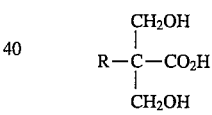

wherein R is hydrogen or a $C_1$–$C_{10}$ alkyl group. The preferred carboxy- containing diol is 2,2-dimethylolpropionic acid. If desired, the carboxy- containing diol or triol may be incorporated into a polyester by reaction with a dicarboxylic acid before being incorporated into the prepolymer. Useful acid group containing compounds include aminocarboxylic acids, for example lysine, cystine and 3,5-diaminobenzoic acid.

The anionic water-dispersible isocyanate-terminated polyurethane prepolymer may be prepared in conventional manner by reacting a stoichiometric excess of the organic polyisocyanate with the polymeric polyol and any other required isocyanate-reactive compounds under substantially anhydrous conditions at a temperature between about 30° C. and 130° C. until the reaction between the isocyanate groups and the hydroxyl groups is substantially complete. A polyisocyanate and the active hydrogen containing components are suitably reacted in such proportions that the ratio of number of isocyanate groups to the number of hydroxyl groups is in the range from about 1.1:1 to about 6:1, preferably within the range of from 1.5:1 to 3:1. If desired, tin catalysts may be used to assist prepolymer formation.

To disperse the prepolymer in water, a tertiary amine is added to the mixture in an amount sufficient to quaternize the carboxylic acid groups therein and to render the prepolymer water dispersible. Typically this is at a level of 65–100% amine equivalents per carboxyl equivalent. Tertiary amines that may be used in the practice of the invention are relatively volatile so that they evaporate from the coating upon curing. Examples of suitable amines are represented by the formula:

where R, $R_1$ and $R_2$ are independently $C_1$–$C_6$, preferably $C_2$–$C_4$ alkyl and aliphatic groups. Illustrative of such tertiary amines are trimethylamine, triethylamine, tri-n-butylamine, tricyclohexylamine, dimethylethylamine, and methyldiethylamine. To enhance the compatibility of the organic and aqueous phases, a small quantity of a polar organic liquid such as N-methylpyrrolidone can be added in amounts ranging from 1 to 12 wt %, preferably 3 to 6 wt %, of the final polymer dispersion. The prepolymer may be dispersed in water using techniques well known in the art. Preferably, the prepolymer is added to the water with agitation, or, alternatively, water may be stirred into the mixture.

To increase the molecular weight of the polyurethane, optionally a chain extender containing active hydrogen atoms is added. The active hydrogen-containing chain extender which is reacted with the prepolymer is suitably a polyol, an amino alcohol, ammonia, a primary or a secondary aliphatic, alicyclic, aromatic, araliphatic or heterocyclic amine, especially a diamine. The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. Of course when water is employed as the chain extender, these ratios will not be applicable since the water, functioning as both a chain extender and dispersing medium, will be present in a gross excess relative to the free isocyanate groups.

Examples of suitable chain extenders include polyethylene polyamines such as ethylenediamine, diethylene triamine, triethylenetetramine, propylenediamine, butylenediamine, hexamethylenediamine, cyclohexylenediamine; polyoxyalkylene polyamines such as polyethyleneoxypolyamine and polypropyleneoxypolyamine, piperazine, 2-methylpiperazine, phenylenediamine, toluenediamine, tris(2-aminoethyl)amine, 4,4'-methylenebis(2-chloraniline), 3,3'-dichloro-4,4'diphenyldiamine, 2,6-diaminopyridine, 4,4'-diaminodiphenyl methane, isophorone diamine, and adducts of diethylenetriamine.

After the formation of the polyurethane polymer, the addition polymer may be formed thereon. Such addition polymer may be one containing acetoacetate functionality or the aldimine functionality described. Polymerization is effected in conventional manner generally using an oil soluble initiator.

Emulsion polymerization of the activated methylene group containing monomer and araldimine-containing unsaturated monomer can be effected by conventional procedures through the use of a free radical polymerization catalyst and stabilizing surfactant system. Examples of free radical generating catalysts include hydrogen peroxide, t-butylhydroperoxide and azobisisobutyronitrile. Optionally, emulsifiers and protective colloids commonly used may be utilized for the emulsion polymerization. By appropriate selection of stabilizer, one can alter the water sensitivity of the resulting polymer. Adjustment is at the discretion of the formulator.

The resulting first and second aqueous dispersions containing polymers having keto methylene functionality and araldimine functionality then are blended to form a one component aqueous polymeric dispersion for coating applications. The first and second dispersions typically will contain about 10 to 60% polymer or solids, preferably 45 to 60% by weight of the emulsion. They are blended in a ratio such that there is an amount of araldimine present in the polymer component of the second dispersion to effect reaction and cure with the polymer containing activated keto methylene groups, e.g., acetoacetate groups contained in the first aqueous dispersion. Generally, the stoichiometry is such that from about 0.1 to 10 equivalents araldimine per equivalent proton on the activated keto methylene group. Preferably, the stoichiometry is from 0.2 to 5 equivalents araldimine per proton on the methylene group.

Alternatively, another method for forming the shelf stable, self-crosslinking water borne dispersion is through redispersion of polymers containing appropriate functionality. These polymers typically are formed through emulsion polymerization followed by spray drying. Reemulsification can be effected by adding the polymer(s) singly or in combination to water and agitating. Optionally, a surfactant, e.g., ethoxylated nonyl phenol or protective colloids such as polyvinyl alcohol and hydroxy ethyl cellulose can be added to the aqueous medium to facilitate redispersion. A variation on this theme is to add one of the polymer components to an emulsion containing the polymer of opposite functionality. The polymer is added to that emulsion to bring the total solids content of the resultant emulsion to a level of about 45 to 65% in appropriate stoichiometry. For purposes herein, the redispersion of a polymer(s) in water forming an emulsion or redispersion of a polymer(s) in water or emulsion containing the polymer of opposite functionality is deemed equivalent to blending first and second aqueous dispersions to form the shelf stable, self-crosslinking dispersion and, therefore, is incorporated within such terms by definition. Examples of redispersible powders are spray dried emulsions of vinyl acetate, vinyl acetate/acrylic; vinyl acetate-ethylene, vinyl acetate-styrene/maleic anhydride polymers, etc. The vinyl acetate may be partially hydrolyzed to convert the acetate groups to hydroxyl groups which then can be converted to acetoacetate groups via transesterification. Vinyl acetate and acrylate- N-vinylformamide polymers which can be hydrolyzed to primary amine containing polymers are another example.

Although not intending to be bound by theory, the key to obtaining a one component, shelf stable aqueous dispersion having self-crosslinkability is in the utilization of an aqueous medium to maintain the water dispersible, water insoluble polymers having activated keto methylene groups and araldimine functionality sufficiently spaced and separated to prevent reaction. When the dispersion is applied to a substrate, and the water evaporated, that space between the two polymers afforded previously by the aqueous medium is reduced thus bringing the activated methylene and araldimine functionality in sufficient proximity for reaction. On the other hand, if the aldimine functionality is a low molecular weight compound or a non-emulsifiable oligomer, e.g., a benzaldimine derivative of ethylene diamine or the aldimine is not capable of forming a stable aqueous polymeric emulsion when the unstabilized aldimine will diffuse into acetoacetate containing polymer particles. Hence, the aqueous dispersion, although being self crosslinkable, is not shelf stable and cannot be used to form a one pack coating or adhesion system.

The following examples are provided to illustrate various embodiments of the invention and are not intended to restrict the scope thereof.

EXAMPLE 1

Preparation of 2-(benzyliminoethoxy)ethanol Intermediate

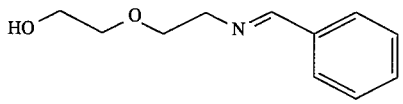

In a three-neck round bottom flask, equipped with a gas inlet, outlet tube, and a water cooling condenser, was charged with 106g (0.5 mol) of benzaldehyde, 200 mL of tetrahydrofuran and 105g (0.5 mol) of 2(2-aminoethoxy-)ethanol in that sequence. The reaction was conducted under nitrogen atmosphere for 18 hours. Solvent was removed using a rotary evaporator and the residual was distilled at a reduced pressure (120°–123° C./1 mmHg) to give a colorless liquid 170.3g (88%). Analysis by NMR and IR showed the following: $^1$H NMR (400 Hz, CDCl$_3$, ppm): 8.24 (1H, s), 7.68 (2H, m), 7.36 (3H, m), 3.75 (4H, m), 3.64 (2H, m), 3.57 (2H, m); IR (NaCl film, cm$^{-1}$): 3384, 2863, 1646, 1451, 1127, 1067, 756, 694.

EXAMPLE 2

Preparation of 2-(benzyliminoethoxy)ethylacrylate Monomer

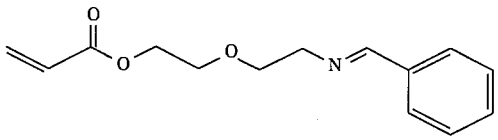

To a 1000 mL three-neck round bottom flask, equipped with an addition funnel, a mechanical stirrer and a cooling water condenser was charged with 123.8g of the 2-(benzyliminoethoxy)ethanol intermediate formed in Example 1, 250 mL of methylene chloride and 64.8g of triethylamine in that sequence. Acryloyl chloride (57.0g) in 50 mL of methylene chloride was added dropwise with vigorous stirring to the mixture in the flask at 0° C. over 1.5 hours. The mixture then was stirred at room temperature for an additional hour. The slurry was then filtered through a Büchner and the solid was washed twice with 2×70 mL of methylene chloride. The organic washings were combined with the filtrate and were washed with water (100 mL) and brine (100 mL), sequentially. The organic was then dried over MgSO$_4$ and solvent was removed using a rotary evaporator to give a viscous liquid 121.1g (76.4%). The product was analyzed by NMR and IR, the results are as follows: $^1$H NMR (400 Hz, CHCl$_3$, ppm): 8.20 (1H, s), 7.64 (2H, m), 7.32 (3H, m), 6.30 (1H, d, J=17.3 Hz), 6.01 (1H, d, d, J=17.3 Hz, J=10.4 Hz), 5.67 (1H, d, J=10.4 Hz), 4.18 (2H, m) 3.71 (4H, m), 3.64 (2H, m); IR (NaCl film, cm$^{-1}$): 3060, 3050, 2870, 1724, 1701, 1648, 1615, 1580, 1450, 1420, 1296, 1272, 1196, 1131, 1072, 983, 809, 755, 737, 695.

EXAMPLE 3

Preparation of Polyurethane Polyester Prepolymer

Into a clean, dry reactor equipped with heating, cooling, stirring and nitrogen blanket capability was charged 96g of polyester polyol (Formrez 55-56 [poly(neopentyl adipate) MW ~2,000]), followed by 87g of methylene dicyclohexyldiisocyanate and 0.2g of dibutyltin dilaurate thereby forming a polyurethane/polyester prepolymer. With agitation, the reaction mixture was brought to 94° C. and held for 0.5 hour. At this point, 25g of N-methylpyrrolidone solvent was added followed by titration for %NCO (theoretical NCO equals 11.6%). When the NCO value was met, 14g of dimethylolpropionic acid powder was added followed by addition of 27g of N-methylpyrrolidone. The reaction temperature was maintained at 94° C. for 2.5 hours to complete the formation of the polyurethane prepolymer.

EXAMPLE 4

Preparation of Hybrid Acetoacetoxyethylmethacrylate/Polyurethane Emulsion

The polyurethane polyester prepolymer of Example 3 was cooled in a reactor to 25° C. while adding 168g of butyl methacrylate. Then 30g of acetoacetoxyethylmethacrylate (AAEM) monomer was added to the reactor followed by addition 0.9g of hexanediol diarylate. To the resulting prepolymer-monomer solution, at 25° C., was added 11g of triethylamine with agitation. This was done in order to dissolve insoluble reactants.

A second reactor was charged with 502g of distilled water under nitrogen blanket and held at 25° C. The water was agitated and the prepolymer-monomer solution described above was added at a rate of 6.7% of the prepolymer-monomer solution per minute in order to form an aqueous dispersion. A catalyst, azobisisobutyronitrile, (VAZO 64), 0.9g in 8.4g of N-methylpyrrolidone, was slowly charged to the vessel and mixed for 5 minutes. Ethylenediamine, 10g, was dissolved in 20g of water and added immediately after the addition of VAZO initiator. The dispersion was heated to 60° to 65° C., and allowed to exotherm to 75° C. The polymerization temperature was maintained until the residual monomers were less than 1,000 ppm.

The resulting aqueous polymer dispersion was a polyurethane/acrylate hybrid containing about 7.5% acetoacetate functionality by weight. It had a solids content of 43%, a pH of about 8 and a viscosity of 50 cps (with #2 spindle at 30 rpm on LTV).

EXAMPLE 5

Preparation of Hybrid Benzyliminoacrylate/Polyurethane Emulsion

The polyurethane polyester prepolymer of Example 3 was added to a reactor and cooled to 25° C. while adding 168g of butyl methacrylate. Then 30g of the 2-(benzyliminoethoxy)-ethylacrylate monomer prepared in Example 2 was added followed by addition 0.9g of hexanediol diarylate. To the resulting hybrid polyurethane prepolymer-monomer solution at 25° C. was added 11g of triethylamine with agitation to dissolve insoluble reactants.

A second reactor was charged with 502g of distilled water under nitrogen blanket and held at 25° C. The water was agitated and the prepolymer-monomer solution was added at a rate of 6.7% of the prepolymer-monomer solution per minute to form an aqueous dispersion. A catalyst, azobisisobutyronitrile, (VAZO 64), 0.9g in 8.4g of N-methylpyrrolidone, was slowly charged and mixed for 5 minutes. Ethylenediamine, 10g, was dissolved in 20g of water and added immediately after the addition of VAZO initiator. The dispersion was heated to 60° to 65° C., and allowed to exotherm to 75° C. The polymerization temperature was maintained until the residual monomers were less than 1,000 ppm.

The resulting aqueous polymer dispersion was a polyurethane/acrylate hybrid containing about 7.5% benzaldimine functionality by weight. The dispersion had a solid content of 43%, a pH of about 8 and a viscosity of 50 cps (with #2 spindle at 30 rpm on LTV).

EXAMPLE 6

Evaluation of One Pack Dispersion

Film Casting

The emulsion polymer of Example 4 comprising the polyurethane/acetoacetylated acrylate hybrid polymer (40% solids) was mixed in a 1:1 ratio at ambient temperature with the polyurethane prepolymer/acrylate benzaldimine hybrid polymer emulsion of Example 5 (40% solids) to form an aqueous blend. Films from the resulting blend were cast on steel plates to form thin dry films having a thickness of 1.3~1.6 mils and thick films having a thickness of about 3 mils. Each film was dried in a static air atmosphere. Film properties were tested periodically. The thin films were used for physical property tests and the thick films were used for swell index and soluble percentage study.

Film Property Testing

Films were tested after air drying at ambient temperature for one day, two days, three days, four days, eight days, fourteen days and twenty-one days. Film samples were also compared to a commercial polyurethane/acrylate hybrid having no crosslinker functionality. Test results are summarized in Table 1.

TABLE 1

| Curing Time (day) | Curing Temperature | Pencil Hardness | Scratch Adhesion | Reverse Impact (lb/in$^2$) | Swell Index (ethanol) | % Soluble (ethanol) |
|---|---|---|---|---|---|---|
| 1 | Ambient T | 2B | 5 | >350 | 1.2 | 23 |
| 2 | Ambient T | 2B | 5 | >350 | 1.1 | 23 |
| 3 | Ambient T | 2B | 5 | >350 | 1.1 | 23 |
| 4 | Ambient T | B | 4 | >350 | 1.4 | 22 |
| 8 | Ambient T | 2B | 4 | >350 | 1.3 | 21 |
| 14 | Ambient T | 2B | 4 | >350 | 1.4 | 22 |
| 21 | Ambient T | B | 4 | >350 | 1.3 | 20 |
| 4 (Flexthane*-620) | Ambient T | 2B | 2 | >350 | dissolved | 100 |
| 14 (Flexthane-620) | Ambient T | — | — | — | dissolved | 100 |

*Flexthane is a trademark of Air Products and Chemicals, Inc. for hybrid urethane/acrylic resins.

The above results show the films had cured within one day via the reaction of the methylene group and araldimine group and retained their formation for several days without a significant change in swell index or ethanol solubility.

EXAMPLE 7

Shelf Stability and Solvent Resistance

The emulsion combination of Example 6 was evaluated for shelf stability and solvent resistance.

Samples stored at ambient temperature for 60, 150 and 270 days showed no color change, no viscosity increase and no coagulation. The swell index and percent soluble data are listed in Table 2.

| Shelf Time (days) | Swell Index | % Soluble |
|---|---|---|
| 60 | 1.2 | 23 |
| 150 | 1.6 | 20 |
| 270 | 1.3 | 23 |

The results show that the emulsion was stable up to 270 days, thus showing the benefits provided via the use of first and second aqueous polymer dispersions incorporating the benzaldimine/acetoacetate cross-linking mechanism. In this case the water acted as a barrier preventing premature cross-linking whereas an oligomeric form of the benzaldimine containing cross-linking system, e.g., an ethylenediamine/benzaldehyde system in combination with the emulsion similar to that of Example 4 had a far shorter shelf life. The percent solubles shows cross-linking effectiveness.

What is claimed is:

1. In a water-based polymeric dispersion comprising a first aqueous dispersion containing a polymer having a plurality of activated keto methylene groups and an effective amount aromatic aldimine containing curing agent to effect cure thereof, the improvement which resides in a one pack coating composition having a shelf stability of at least sixty days and comprises a blend of:

said first aqueous dispersion containing said polymer having activated keto methylene groups and wherein the activated keto methylene group in the polymer contained in said first aqueous dispersion containing said activated keto methylene groups is represented by the structures:

or

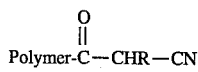

wherein R is hydrogen or methyl and $R_1$ is $C_{1-4}$ alkyl, a second aqueous dispersion containing a polymer having a plurality of araldimine functionality wherein said polymer having araldimine functionality is represented by the structure:

Polymer—N=CH—R₂ wherein R₂ is the residue of an aromatic or heterocyclic aldimine and at least a portion of the polymer in said first and aqueous dispersions has emulsion polymerized ethylenically unsaturated monomer units represented by the structure:

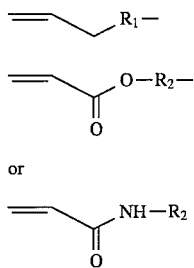

wherein R₁ is $C_{1-10}$ alkyl, $C_{1-10}$ alkoxy, hydroxyalkyl where the alkyl group has from 1–10 carbon atoms and R₂ is $C_{1-10}$ alkyl, alkoxy, hydroxyalkyl where the alkyl group has from 1–10 carbon atoms.

2. The water-based polymeric dispersion of claim 1 wherein the activated keto methylene functionality is represented by the formula:

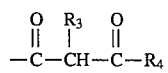

wherein R₃ hydrogen or CH₃ and R₄ is $C_{1-4}$ alkyl.

3. The water-based polymeric dispersion of claim 2 wherein the substituent —N=CH—R₂ is represented by the formulas selected from the group consisting of:

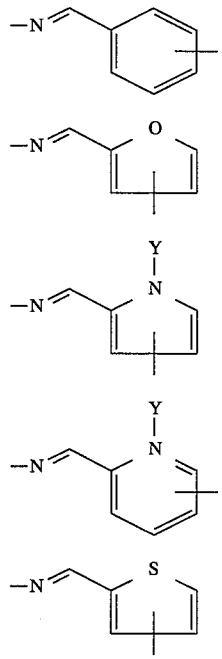

wherein Y is hydrogen or methyl.

4. The water-based polymeric dispersion of claim 3 wherein R₃ of the acetoacetate group is hydrogen.

5. The water-based polymeric dispersion of claim 4 wherein the weight percent of acetoacetate functionality is from 2.5 to 50 percent by weight based on the total weight of the polymer wherein at least a portion of the polymer has emulsion polymerized ethylenically unsaturated monomer units.

6. The water-based polymeric dispersion of a claim 5 wherein the weight percent of araldimine functionality is from 2.5 to 50 percent by weight based upon the total weight of the polymer wherein at least a portion of the polymer has emulsion polymerized ethylenically unsaturated monomer units.

7. The water-based polymeric dispersion of claim 6 wherein the acetoacetate group is pendent thereof an ethylenically unsaturated monomer, the unsaturated monomer having unsaturation represented by the formulas:

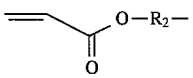

wherein R₂ is $C_{1-4}$ alkylene.

8. The water based polymeric dispersion of claim 7 wherein the araldimine functionality is present in a monomer represented by the formula:

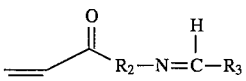

wherein R₂ is $C_{1-10}$ alkyl or $C_{1-10}$ alkoxy and R₃ is the residue of benzaldehyde.

9. The water-based polymeric dispersion of claim 8 wherein the molecular weight of the polymer containing acetoacetate functionality is from about 10,000 to 500,000.

10. The water-based polymeric dispersion of claim 9 wherein the molecular weight of the polymer containing araldimine functionality is from about 10,000 to 500,000.

11. The water-based polymeric dispersion of claim 10 wherein R₂ of the araldimine polymer is $C_{1-10}$ alkoxy.

12. The water-based polymeric dispersion of claim 11 wherein the acetoacetate containing monomer is acetoacetoxyethylmethacrylate.

13. The water-based polymeric dispersion of claim 11 wherein the acetoacetate containing monomer is N-acetoacetylacrylamide.

14. The water-based polymer dispersion of claim 12 wherein the acetoacetate containing monomer is present in an amount of from 5–25 percent by weight of the total polymer and the substituent —N=CH—R₂ of the araldimine containing polymer is selected from the group consisting of:

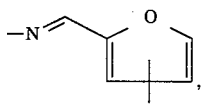

,

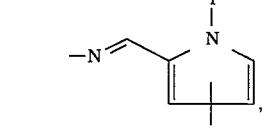

,

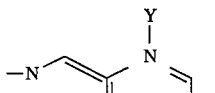

and

-continued

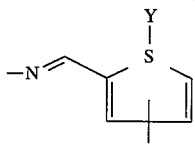

wherein Y is hydrogen or methyl.

15. The water-based polymeric dispersion of claim 14 wherein the araldimine functionality in the polymer of the second aqueous dispersion is present in amount of 5 to 25% by weight of the total weight of the polymer.

16. The water-based composition of claim 15 wherein the stoichiometry of the water-based dispersion is that there are from 0.1 to 10 equivalents aromatic aldimine functionality per proton on the acetoacetate group.

17. In a water-based polyurethane/acrylate hybrid having acetoacetate functionality and an aromatic aldimine crosslinker, the improvement which resides in a one pack coating composition having a shelf stability of at least sixty days and comprises a blend of:

a) a water based emulsion polymerized polyurethane/acrylate hybrid having 2.5–50% acetoacetate functionality and b) a water based emulsion polymerized polyurethane/acrylate hybrid having aromatic or heterocyclic aldimine groups pendent from emulsion polymerized ethylenically unsaturated monomer units.

18. The water based polyurethane/acrylate dispersion of claim 17 wherein the polyurethane is formed from an isocyanate selected from the group consisting of toluenediisocyanate, isophoronediisocyane, methylene di(phenylisocyanate), and methylene di(cyclohexylisocyanate)acrylate.

19. The water based polyurethane/acrylate dispersion of claim 18 wherein the polyurethane is formed from a long chain polyol having a molecular weight of form about 200 to 3000.

20. The water based polyurethane/acrylate dispersion of claim 19 wherein the polymer containing acetoacetate functionality contains polymerized units of acetoacetoxyethylmethacrylate.

21. The water-based polyurethane hybrid of claim 20 wherein the polymer containing araldimine functionality contains polymerized units of a monomer having the formula:

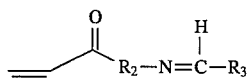

wherein $R_2$ is $C_{1-10}$ alkyl or alkoxyl and $R_3$ is the residue of benzaldehyde.

22. The water-based polyurethane hybrid of claim 21 wherein the polymer containing araldimine functionality is a copolymer comprising polymerized units of an acrylic monomer comprising methacrylate, butylacrylate, or ethylhexylacrylate.

23. The water based polyurethane/acrylate dispersion of claim 21 wherein the polymer containing acetoacetate functionality contains polymerized units of acetoacetoxyethylmethacrylate or a copolymer comprising polymerized units of an acrylic monomer comprising methacrylate, butylacrylate, or ethylhexylacrylate.

* * * * *